United States Patent [19]

Shimojima

[11] Patent Number: 4,725,723
[45] Date of Patent: Feb. 16, 1988

[54] OPTICAL ROTARY ENCODER WITH LIGHT MONITORING AND CONTROL

[75] Inventor: Yoji Shimojima, Furukawa, Japan

[73] Assignee: Alps Electric Co., Ltd., Japan

[21] Appl. No.: 702,824

[22] Filed: Feb. 19, 1985

[30] Foreign Application Priority Data

Feb. 16, 1984 [JP] Japan .............................. 59-19836[U]

[51] Int. Cl.$^4$ ................................................ G01J 1/32
[52] U.S. Cl. .............................. 250/205; 250/231 SE
[58] Field of Search ............. 250/231 SE, 237 G, 205; 340/347 P; 356/395

[56] References Cited

U.S. PATENT DOCUMENTS

| | | | |
|---|---|---|---|
| 3,532,434 | 10/1970 | Jones et al. | 250/205 |
| 3,775,617 | 11/1973 | Dubauskas | 250/205 |
| 4,078,173 | 3/1978 | Fultz | 250/237 G |
| 4,254,331 | 3/1981 | Dorman et al. | 250/205 |

Primary Examiner—David C. Nelms
Attorney, Agent, or Firm—Guy W. Shoup

[57] ABSTRACT

An optical rotary encoder comprises reflecting portions and nonreflecting portions provided alternately on a peripheral surface of a measured body freely rotatable, a light emitting diode for projecting light onto the measured body, a number of light receiving elements each delivering an output pulse signal upon reception of the light reflected from the reflecting portions of the measured body, and a counter for counting the number of pulses of the output signal obtained from the light receiving element for providing an output corresponding to a rotating angle of the measured body. A monitoring light receiving element is further provided near the light emitting diode, and the light output of the light emitting diode is controlled based on the output signal obtained from the monitoring light receiving element.

2 Claims, 7 Drawing Figures

OPTICAL ROTARY ENCODER WITH LIGHT MONITORING AND CONTROL

BACKGROUND OF THE INVENTION

1. Field of the Invention

This invention relates to an optical rotary encoder capable of detecting rotating angles of a rotating body to be measured by use of a light emitting diode and light receiving elements, and more particularly to an optical rotary encoder of a light reflecting type.

2. Description of Prior Art:

Optical rotary encoders of light reflecting type and light transmitting type have been widely known. FIG. 1 illustrates a light reflecting type rotary encoder, and FIG. 2 illustrates, in much enlarged scale, a detecting portion of the light reflecting type rotary encoder shown in FIG. 1. As shown in the drawing, the conventional rotary encoder comprises a rotatable disc 1, the rotating angle of which is to be measured. A number of reflecting portions 2 are provided on the surface of the rotatable disc 1 at a predetermined pitch, while the same number of non-reflecting portions 3 are provided between the reflecting portions 2 in an interposed manner. The rotatable disc 1 is secured to a rotating shaft (not shown) to be rotated therewith.

A supporting member 4 with two mounting holes 5 and 6 is provided adjacent to a peripheral portion of the disc 1 in a relation opposing thereto. A light emitting element such as a light emitting diode (LED) 7 is mounted in the hole 5, while a light receiving element 8 such as a phototransistor is mounted in the hole 6. When one of the reflecting portions 2 of the disc 1 is brought into opposition to the holes 5 and 6 provided through the supporting member 4, light emitted from the light emitting diode 7 is reflected by the reflecting portion 2 to be received in the light receiving element 8 which delivers an output signal of high level. Conversely, when the holes 5 and 6 are brought into opposition to one of the nonreflecting portions 3, the light emitted from the light emitting diode 7 is absorbed by the nonreflecting portion 3, rendering the output signal from the light receiving element 8 to be low level. As a consequence, a pulse signal is delivered from the light receiving element 8 according to the rotation of the rotating disc 1, and by counting the number of the pulses of the pulse signal, a rotating angle of the rotating disc 1 can be detected.

The above described light emitting diode 7 used as a light source in the optical rotary encoder, however, reduces its light emitting property when the temperature thereof becomes high, and therefore the intensity of the pulse signal delivered from the light receiving element 8 is varied in accordance with the temperature variation. Such a result entails a serious difficulty when a high precision detection of the rotating angle of the rotating disc 1 is required.

SUMMARY OF THE INVENTION

An object of the present invention is to provide an optical rotary encoder wherein the above described difficulties of the conventional encoder can be substantially eliminated.

Another object of the invention is to provide an optical rotary encoder wherein a high precision detection of the rotating angle can be executed regardless of temperature rise and variation of the property of the light emitting diode.

These and other objects of the present invention can be achieved by an optical rotary encoder wherein a light receiving element of monitor use is further provided near the light emitting diode for detecting light emitted from the light emitting diode, and the light output of the light emitting diode is controlled based on the output signal obtained from the light receiving element used as a monitor.

DESCRIPTION OF THE PREFERRED EMBODIMENT

A preferred embodiment of the present invention will now be described with reference to FIGS. 3 through 7.

Figure 1:
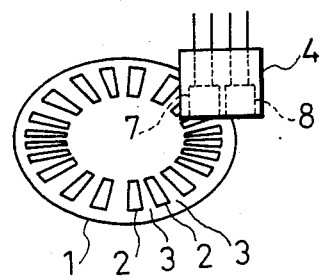
FIG. 1 is a perspective view showing a conventional light reflecting type rotary encoder.
Figure 2:
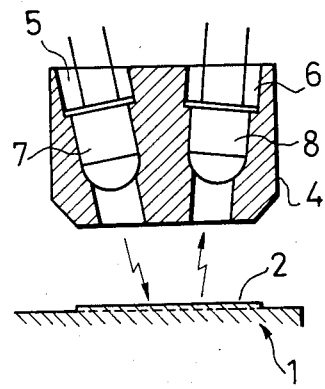
FIG. 2 is an enlarged sectional view of a detecting portion of the light reflecting type rotary encoder shown in FIG. 1.
Figure 3:
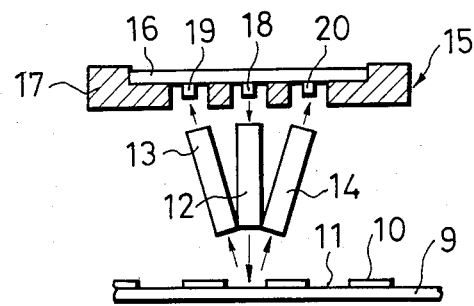
FIG. 3 is a diagram showing an optical rotary encoder constituting a preferred embodiment of the present invention.
Figure 4:
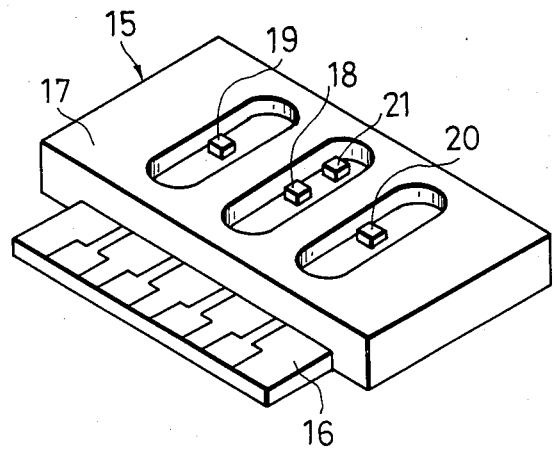
FIG. 4 is a perspective view showing a photoreflector portion of the optical rotary encoder shown in FIG. 3.
Figure 5:
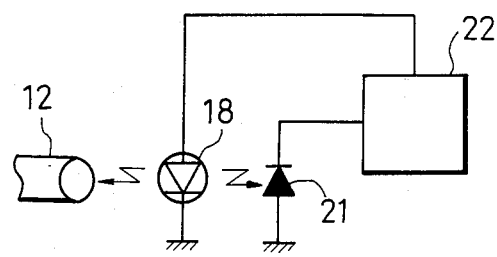
FIG. 5 is an explanatory diagram for a light output compensating circuit to be used for the optical rotary encoder shown in FIG. 3.

As illustrated in FIGS. 3, 4 and 5, the embodiment comprises a rotatable measured body such as a code wheel 9, a plurality of reflecting portions 10 and non-reflecting portions 11 provided alternately on the surface of the code wheel 9 at a constant pitch, a light emitting optical fiber 12, and two light receiving optical fibers 13 and 14 which are arranged on both sides of the light emitting optical fiber 12. The optical fibers 12, 13 and 14 are held at precise positions by use of a thermoplastic material so that the end portions adjacent to the code wheel 9 are brought into abutment, while the other ends thereof are separated from each other by a predetermined distance. The separated ends of the optical fibers 12, 13 and 14 are secured to a photoreflector 15 which is described hereinafter in more detail.

The photoreflector 15 is a composite member comprising a base plate 16 and a frame 17. A light emitting element such as a light emitting diode 18 is secured by soldering to a central position of the base plate 16, while two light receiving elements 19 and 20, such as phototransistors, are likewise secured on both sides of the light emitting diode 18 by soldering. Among these elements, the light emitting diode 18 is coupled with the light emitting optical fiber 12, while the light receiving elements 19 and 20 are coupled with the light receiving optical fibers 13 and 14, respectively. Numeral 21 designates another light receiving element used as a monitor for detecting the light output of the light emitting diode 18. The light receiving element 21 is mounted on the base plate 16 at a position near the light emitting diode 18 by soldering.

FIG. 5 illustrates a light output compensating circuit including a light output adjusting circuit 22 which is connected to the output of the monitor element 21. The light output of the light emitting diode 18 is monitored by the monitor element 21, and an electric signal delivered from the monitor element 21 is applied to the light output adjusting circuit 22. The circuit 22 is a well known circuit comprising an operational amplifier and a transistor or the like used for driving LED. The output terminal of the light output adjusting circuit 22 is connected to the light emitting diode 18 for controlling the same so as to deliver a constant light output.

Figure 6:
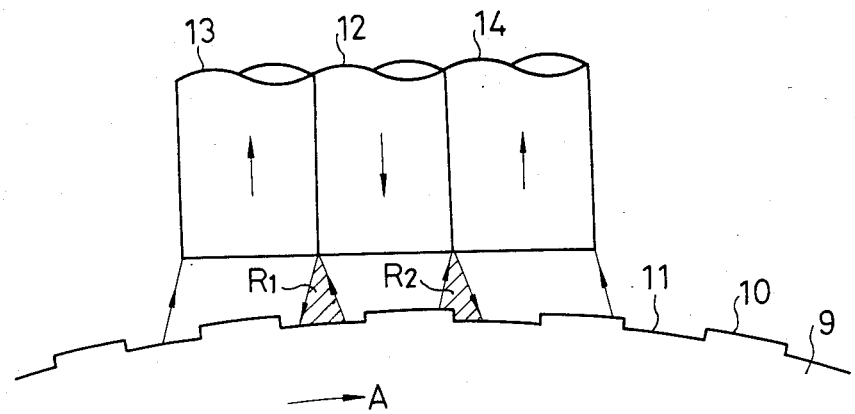
FIG. 6 is a diagram for explaining the operation of the optical rotary encoder according to the present invention.
Figure 7:
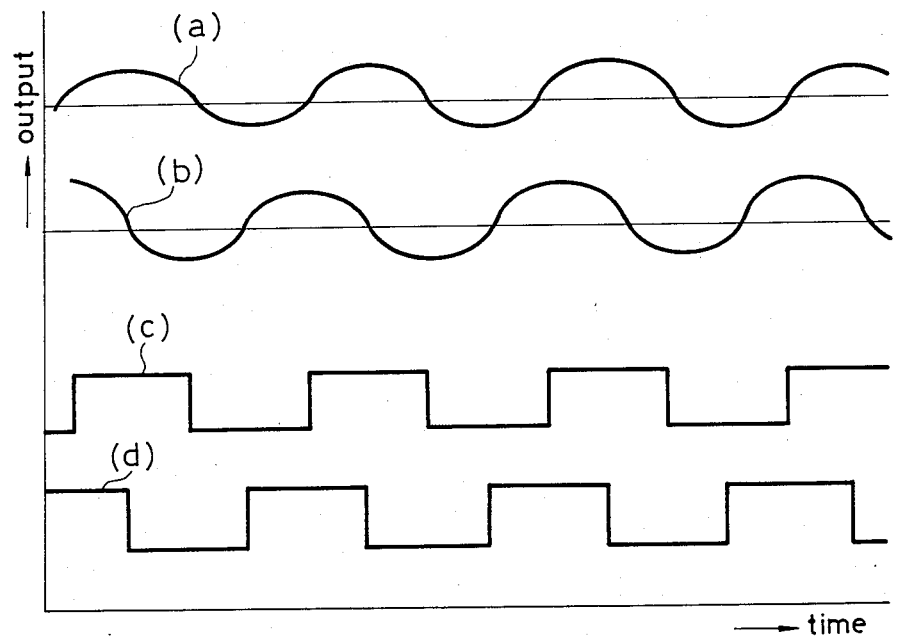
FIG. 7 is a waveform diagram showing waveforms of various signals related to the output signals obtained from the light receiving elements.

FIG. 6 is a diagram for explaining the operation of the optical rotary encoder of the above described construction, while FIG. 7 is a waveform diagram showing output signals obtained from the light receiving elements. In FIG. 6, $R_1$ designates an effective reflection range in which the light receiving optical fiber 13 receives the light emitted from the end of the light emitting optical fiber 12 and reflected by a light reflecting portion 10, while $R_2$ designates another effective reflection range in which the light receiving optical fiber 14 can receive the light emitted from the end of the light emitting optical fiber 12 and reflected from the light reflecting portion 10.

It is assumed that the code wheel 9 is rotating in the arrow-marked direction A in FIG. 6, and that while the effective reflection range $R_1$ is held at the center of a nonreflecting portion 11, the other effective reflection range $R_2$ is held at a position where a left half of the range $R_2$ is occupied by a reflecting portion 10 while a right half of the range $R_2$ is occupied by a nonreflecting portion 11. In this state, the light emitted from the light emitting diode 18 is passed through the light emitting optical fiber 12 to the peripheral surface of the code wheel 9, and according to the rotation of the code wheel 9, the light is intermittently reflected from the reflecting portion 10. One part of the light is then received in the light receiving element 19 through the light receiving optical fiber 13, while another part of the light reflected by the reflecting portion 10 is received in the light receiving element 20 through the light receiving optical fiber 14. As a result, an output waveform (a) in FIG. 7 is obtained from the light receiving element 20, while another output waveform (b) in FIG. 7 which is in a phase relation delayed by 90° from the waveform (a) is obtained from the light receiving element 19. The waveforms (c) and (d) shown in FIG. 7 illustrate pulse signals obtained by shaping the waveforms (a) and (b), respectively.

The output pulse signals of the waveforms (a) and (b) and designated by A phase signal and B phase signal, respectively. When the code wheel 9 is rotated in the arrow-marked direction A, the B phase pulse signal always falls down with a delayed of 90° after the rising up instant of the A phase pulse signal. Conversely, when the code wheel 9 is rotated in a direction opposite to the arrow-marked direction A, and B phase pulse signal rises up with the delay of 90° after the rising up instant of the A phase pulse signal. Accordingly, the rotating direction of the code wheel 9 can be detected by simply surveying the variation of the B phase signal based on the rising instant of the A phase pulse signal. Furthermore, by superposing the A phase signal with the B phase signal, a comparatively large output level can be assured regardless of a small pitch of the reflecting portions 10 or the nonreflecting portions 11. Accordingly, the difference between the high and low level portions of the output signal can be increased for improving the resolution of the rotary encoder.

In the above described embodiment of the present invention, since the variation of the light output of the light emitting diode due to the ambient temperature and used years is compensated for by use of the monitoring light receiving element 21 and the light output adjusting circuit 22, an optical rotary encoder operable at high precision can be provided, and furthermore, since the monitoring light receiving element 21 is mounted on the base plate 16 at a position adjacent to the light emitting diode 18, the construction of the high precision rotary encoder can be substantially simplified.

What is claimed is:

1. In an optical rotary encoder comprising reflecting portions and nonreflecting portions provided alternately on a peripheral surface of a rotatable body, a light emitting element for projecting light on the peripheral surface of the rotatable body, a pair of light detecting elements for detecting light reflected from the reflecting portions and each providing an output pulse signal corresponding thereto, and means for counting pulses of the output signals and providing an output indicating an angle of rotation of the rotatable body, the improvement comprising: a light emitting diode as said light emitting element mounted to a mounting plate of said encoder, and the pair of light detecting elements mounted to said plate on each side of said light emitting diode; and a light monitoring element mounted on said plate in proximity to said light emitting diode for monitoring its light emitting level, and means connected to an output of said light monitoring element for controlling the light emitting level of said light emitting diode.

2. An optical rotary encoder as set forth in claim 1 wherein a light output adjusting circuit is provided to receive the output of said light monitoring element, and the output of said light output adjusting circuit is applied to said light emitting diode for controlling the diode so as to deliver a substantially constant light output.

* * * * *